United States Patent
Karasaridis et al.

(10) Patent No.: US 10,834,114 B2
(45) Date of Patent: Nov. 10, 2020

(54) MULTI-TIERED SERVER ARCHITECTURE TO MITIGATE MALICIOUS TRAFFIC

(71) Applicant: AT&T Intellectual Property I, L.P., Atlanta, GA (US)

(72) Inventors: Anestis Karasaridis, Oceanport, NJ (US); Eric Noel, Holmdel, NJ (US); Stephen Chou, Bridgewater, NJ (US); Patrick Velardo, Manalapan, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 101 days.

(21) Appl. No.: 16/219,472

(22) Filed: Dec. 13, 2018

(65) Prior Publication Data

US 2020/0195669 A1  Jun. 18, 2020

(51) Int. Cl.
| | |
|---|---|
| *H04L 29/06* | (2006.01) |
| *H04L 29/12* | (2006.01) |
| *H04L 12/24* | (2006.01) |
| *G06N 3/08* | (2006.01) |
| *G06N 3/04* | (2006.01) |

(52) U.S. Cl.
CPC .......... *H04L 63/1425* (2013.01); *H04L 41/16* (2013.01); *H04L 61/1511* (2013.01); *H04L 63/10* (2013.01); *H04L 63/1458* (2013.01); *G06N 3/0454* (2013.01); *G06N 3/084* (2013.01)

(58) Field of Classification Search
CPC . H04L 63/1425; H04L 63/10; H04L 63/1458; H04L 41/16; H04L 61/1511; G06N 3/0454; G06N 3/084
See application file for complete search history.

(56) References Cited

U.S. PATENT DOCUMENTS

| | | |
|---|---|---|
| 9,483,742 B1 | 11/2016 | Ahmed |
| 10,050,917 B2 | 8/2018 | Alperovitch et al. |
| 10,084,806 B2 | 9/2018 | Ward et al. |
| 10,084,814 B2 | 9/2018 | Fakeri-Tabrizi et al. |
| 10,129,270 B2 | 11/2018 | Doctor et al. |
| 10,623,425 B2 * | 4/2020 | Shitrit-Efergan ............. H04L 63/1425 |
| 2015/0180892 A1 * | 6/2015 | Balderas ............. H04L 63/1416 726/11 |
| 2016/0065534 A1 | 3/2016 | Liu et al. |
| 2016/0065597 A1 | 3/2016 | Nguyen et al. |

(Continued)

FOREIGN PATENT DOCUMENTS

WO  2018027050 A1  2/2018

*Primary Examiner* — Hee K Song

(57) ABSTRACT

A processing system having at least one processor may obtain domain name system (DNS) traffic records of a DNS platform, the DNS traffic records associated with a source device having a first status and that is submitting DNS queries, where a first-tier DNS authoritative server of the DNS platform is configured to forward the DNS queries from the source device to at least a first second-tier DNS authoritative server of the DNS platform designated for the first status. The processing system may further detect anomalous DNS traffic records from the DNS traffic records, identify a change of the source device from a first status to a second status, based upon the detecting the anomalous DNS traffic records, and reconfigure the first-tier DNS authoritative server to redirect the DNS queries from the source device to at least a second second-tier DNS authoritative server designated for the second status.

20 Claims, 5 Drawing Sheets

(56) References Cited

U.S. PATENT DOCUMENTS

| | | | |
|---|---|---|---|
| 2016/0065611 A1* | 3/2016 | Fakeri-Tabrizi | H04L 63/1441 |
| | | | 726/23 |
| 2017/0279833 A1 | 9/2017 | Vasseur et al. | |
| 2017/0279839 A1 | 9/2017 | Vasseur et al. | |
| 2018/0097835 A1 | 4/2018 | McGrew et al. | |
| 2018/0302435 A1* | 10/2018 | Koster | H04L 43/0876 |
| 2018/0365581 A1 | 12/2018 | Vasseur et al. | |
| 2019/0007365 A1 | 1/2019 | Dan et al. | |

* cited by examiner

MULTI-TIERED SERVER ARCHITECTURE TO MITIGATE MALICIOUS TRAFFIC

The present disclosure relates generally to identifying network security events, and more particularly to methods, computer-readable media, and devices for reconfiguring a first-tier domain name system authoritative server to redirect domain name system queries from a source device to a second-tier domain name system authoritative server designated for a second status, in response to identifying a change of the source device from a first status to the second status.

BACKGROUND

Internet traffic is extremely heterogeneous and thus defining what is "normal" is a challenging task. In addition, compared with the total volume of Internet traffic, an attack or other types of anomalous traffic may be considered as a rare event and may also have a unique pattern. Thus, bad actors may find it easy to blend within the overall Internet traffic undetected and perform malicious acts. For instance, as attack patterns evolve over time, conventional fixed signatures for attack detection may be easily circumvented, and network operators or other interested parties may be unaware of new types of attacks. With a volumetric based approach, numerous measurements and features may be collected to investigate anomalous traffic patterns. However, conventional detection and classification may involve overfitting with irrelevant or redundant features from the dataset, and may result in an excess number of false alarms. Moreover, attempts to describe anomalous behavior in terms that are understood by human beings often fail as the number of features that characterize a phenomenon may be much higher than what can be perceived. For this reason, anomalous behavior description may be reduced to few parameters, which in turn may cause mitigation efforts to either block benign traffic or to permit malicious traffic.

SUMMARY

In one example, the present disclosure describes a method, computer-readable medium, and device for reconfiguring a first-tier domain name system authoritative server to redirect domain name system queries from a source device to a second-tier domain name system authoritative server designated for a second status, in response to identifying a change of the source device from a first status to the second status. For instance, in one example, a method may include a processing system having at least one processor obtaining a first plurality of domain name system traffic records of a domain name system platform, the first plurality of domain name system traffic records associated with a source device that is submitting domain name system queries, the source device having a first status, where a first-tier domain name system authoritative server of the domain name system platform is configured to forward the domain name system queries from the source device to at least a first second-tier domain name system authoritative server of the domain name system platform designated for the first status. The processing system may further detect anomalous domain name system traffic records from the first plurality of domain name system traffic records, identify a change of the source device from the first status to a second status, based upon the detecting the anomalous domain name system traffic records, and reconfigure the first-tier domain name system authoritative server to redirect the domain name system queries from the source device to at least a second second-tier domain name system authoritative server designated for the second status, in response to identifying the change of the source device from the first status to the second status.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
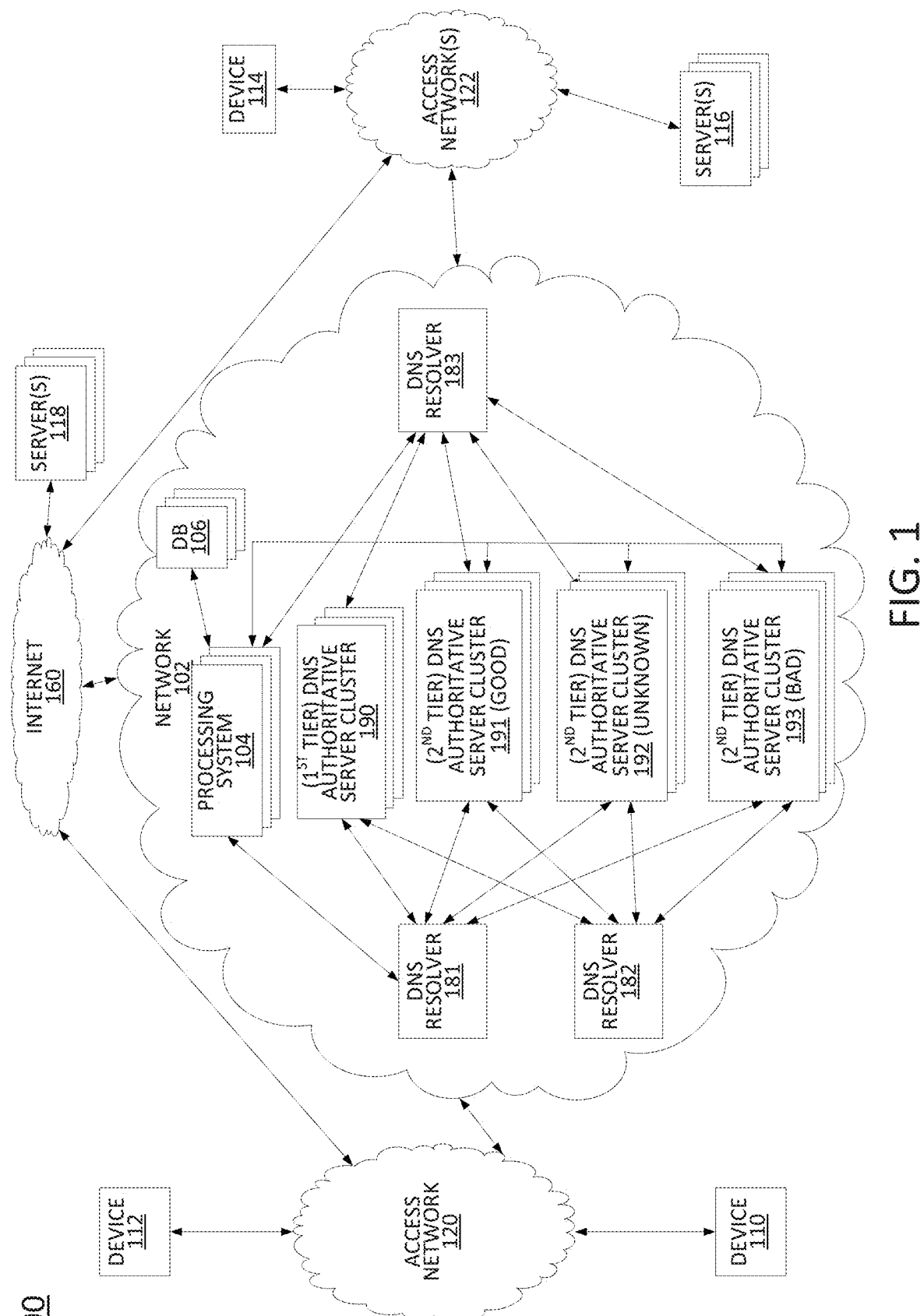
FIG. 1 illustrates an example network related to the present disclosure.

The Domain Name System (DNS) is one of the core building blocks of modern Internet infrastructure. For this reason it has become a main target of distributed denial of service (DDoS) attacks and other malicious activities. For a given website, a record associating its uniform resource locator (URL) with one or more Internet Protocol (IP) addresses is maintained at a specific DNS authoritative server. Denying access to this DNS authoritative server may prevent clients from accessing the website. Attackers are using techniques such as overloading a DNS authoritative server with resolving requests in order to cause the DNS authoritative server to eventually crash. However, attackers are not accessing the DNS authoritative server directly. Rather, attackers are relying upon other servers, specifically DNS resolvers, to send the actual requests to the DNS authoritative servers, which may make it hard to distinguish between "good" and "bad" traffic.

Many mitigation techniques that aim at blocking malicious traffic often end up blocking benign traffic as well. Special sites called "scrubbing" centers may apply a manually selected set of filters. This involves significant human intervention and may provide a limited, pre-set number of options to block the malicious traffic. However, many times malicious traffic cannot be distinguished clearly from legitimate traffic since both can appear as requests that follow the network protocol. Human intervention introduces the possibility that a wrong filter is applied that blocks legitimate traffic. In addition, scrubbing centers may absorb flows for other protocols and services, and may therefore be overwhelmed from a high volume of traffic. This also potentially creates a single point of failure that can affect the multitude of services.

The present disclosure features a multi-tiered architecture of DNS server clusters. Flows are not specifically classified as good or bad. Instead, using machine learning (ML), source devices submitting DNS queries are attributed reputation scores that determine the quality of service a DNS query will receive. For instance DNS queries from a source device with a high reputation score may be directed to DNS server clusters dedicated to "good" sources while DNS queries from source devices with lower reputation scores are directed to a different cluster of DNS servers that may provide a lower quality of service. Still, no queries are being dropped, thus the risk of completely blocking legitimate query activity is reduced. In one example, DNS traffic flows may be adaptively modified (e.g., by a SDN controller) to optimize service based on the reputation of the requester.

In one example, the machine learning-based reputation score building includes a two stage multi-class security event detection and classification process to identify anomalous network traffic. More specifically, in one example, the present disclosure includes an unsupervised encoder-decoder neural network learning approach, which assumes no prior knowledge of the nature of the analyzed network traffic. Initially, examples of the present disclosure may build an encoder-decoder neural network (e.g., an autoencoder) that learns the characteristics of "normal" network traffic from a plurality of input vectors. For instance, in an example relating to DNS traffic, and more specifically to traffic associated with DNS authoritative servers, the encoder-decoder neural network may be trained with "input aggregate vectors," which in one example may comprise one minute aggregate records per source IP address (e.g., per DNS resolver). Unlike principal component analysis (PCA), which is typically a linear transform, a neural network structure can implement nonlinear transforms to capture more complicated traffic patterns. It should be noted that in one example, instead of utilizing the original network traffic data for anomalous traffic classification, input aggregate vectors (e.g., aggregate features sets) are utilized to enhance the detection accuracy and reduce the computational complexity.

In one example, an encoder-decoder neural network of the present disclosure generates two sets of results. One is a reconstruction error for each input vector, which may be used to identify anomalous network traffic records. For instance, the reconstruction error may comprise the difference (e.g., a Euclidean distance) between the input vector and a reconstructed vector that is output from the encoder-decoder neural network. In accordance with the present disclosure, when the reconstruction error exceeds a threshold, the encoder-decoder neural network does not accurately capture the network traffic data, and thus the network traffic data is considered to be anomalous. In one example, sources (e.g., IP addresses, or the devices identified thereby) associated with the anomalous network traffic data may be identified and flagged for remedial action. In one example, the sources (or "source devices") may include DNS resolvers initiating requests to one or more authoritative DNS servers. In one example, the sources may alternatively or additionally include one or more clients directing DNS queries to DNS resolvers.

The other output of the encoder-decoder neural network is a feature vector with reduced dimensions (broadly, a "compressed vector representation"), which may also be utilized for anomalous network traffic detection, and which may further be utilized to classify particular types of anomalous network traffic. For instance, in one example, compressed vector representations associated with anomalous network traffic are clustered and may further be labeled based on anomaly type. A first cluster may represent "normal" network traffic, while one or more additional clusters may each represent a type of attack or other malicious and/or anomalous activities. Thereafter, compressed vector representations of input vectors for subsequent network traffic data that fall within a cluster may further be identified as a particular type of anomaly. In addition, sources (e.g., IP addresses) that may be involved in or otherwise associated with the identified anomalous network traffic data may be identified and the statuses/reputation scores adjusted accordingly.

In one example, network traffic records are aggregated (e.g., by one minute time intervals, or another time interval, by DNS resolver or by some other criteria, etc.). Notably, tens of billions of daily records may be scaled-down to several million input aggregate vectors, which may be efficiently processed via an encoder-decoder neural network as described herein. The encoder-decoder neural network may further implement non-linear transforms to reduce feature dimensions to facilitate the anomaly classification. Examples of the present disclosure are thus computationally efficient, and may be deployed for anomalous network traffic detection in real-time or near real-time. In addition, although examples of the present disclosure are described herein primarily in connection with DNS traffic records, in other, further, and different examples, the present disclosure may equally apply to network security event detection regarding other types of network traffic, such as: transmission control protocol (TCP) SYN/ACK messaging, software defined network (SDN) control messaging (e.g., NETCONF messaging, YANG messaging, or the like), server connection request messages at one or more servers of one or more domains, border gateway protocol (BGP) update messages, content retrieval from a content distribution network (CDN), and so forth.

In one example, the compressed vector representation generated via the encoder-decoder neural network includes a different set of features from the input vector, which may have no apparent meaning to a human observer. Many applications of encoder-decoder neural networks involve image compression, where the encoder portion of the encoder-decoder neural network is utilized to generate a compressed image version, e.g., for transmission over a network, for storage, etc., and the decoder portion is utilized to recreate the image at the destination, after retrieval from storage, etc. Thus, the compressed vector representation is simply a format from which the original input vector (or a good approximation thereof) can be recreated. Some applications also use encoder-decoder neural networks for noise reduction, image smoothing, and other tasks. In all of these cases, the compressed vector representation is purely intermediate data and is of value only for the reconstruction of the original input vector or an approximation thereof.

One common task for machine learning (ML) in cybersecurity is to identify the observable features of anomalies for root-cause analysis and solution recommendation. However, cyber-attacks are often hidden in a multitude of regular harmless traffic. In other words, the malicious traffic volume is extremely small compared to normal traffic. In addition, most existing clustering methods work well only for even cluster sizes. Hence existing clustering algorithms applied to general Internet traffic records may fail to generate and/or to identify clusters which represent malicious traffic. Furthermore, existing clustering approaches may require upfront knowledge of the total number of clusters, which may be unavailable.

In contrast, examples of the present disclosure may also utilize the compressed vector representation for clustering and anomalous network traffic identification. In one example, the compressed vector representations of input vectors (e.g., "input aggregate vectors") are clustered such that each cluster may identify a different anomaly related to the domain problem. The present clustering technique can be efficiently applied to high-dimensional spaces, is insensitive to highly uneven cluster sizes, and does not require prior knowledge of a total number of clusters.

In one example, the present disclosure utilizes a clustering technique that includes a multi-dimensional distance calculation which is efficient over large volumes of data and which scans and merges samples (e.g., compressed vector representations of network traffic data) into clusters. In one example, the present disclosure first calculates a normalized distance as a clustering criterion. In accordance with the present disclosure, a normalized distance for a single dimension (e.g., an individual feature type/field of the compressed vector representation) assumes there is a maximum value and a minimum value for features of such a feature type. The normalized distance for the dimension is then defined as the difference between the maximum value and the minimum value divided by one less than the number of samples (e.g., the number of compressed vector representations to be clustered). In other words, if the samples were evenly distributed along the single dimension, each would be separated from the next by the normalized distance. For a multi-dimensional feature space, the aggregate normalized distance is a Euclidean distance defined as the product of normalized distances for each of the component dimensions divided by one less than the number of samples.

With the aggregate normalized distance being calculated, the clustering process may then include assigning each sample to an individual cluster. In one example, for each sample/cluster, other samples/clusters within a threshold distance are identified. The threshold distance may be based upon the aggregate normalized distance, e.g., 1.5 times the normalized distance, 2 times the normalized distance, 8 times the normalized distance, etc. Nearby clusters (i.e., samples and/or clusters of multiple samples that are within the threshold distance/scaled normalized distance) are then merged. In one example, the scaling factor over the aggregate normalized distance is used to control how dense or how loose the clustering should be. The clustering ends when no additional clusters can be merged according to the above criteria. Any outliers will stay as outlier clusters and have no impact on other clusters.

In one example, the largest cluster may be automatically labeled as being associated with "normal" network traffic data. One or more other clusters may then be identified as anomalous network traffic data. In one example, the other clusters may also be labeled, e.g., by a network technician, by a subject matter expert, etc. In another example, the other clusters may be labeled automatically. For instance, compressed vector representations that are the samples for clustering may be known to represent input vectors relating to the network traffic data from particular sources to particular destinations, etc. To illustrate, a network intelligence database may be maintained wherein certain sources (e.g., IP addresses) have been identified as being associated with particular types of anomalous traffic, such as known botnet command and control servers, known sources of scan and probe attacks, known DNS authoritative server DDoS attack sources, and so forth. For instance, different network operators may share data of this nature such that when a given network detects anomalous traffic from a particular bad actor, or group of bad actors for the first time, the anomalous traffic may be detected via the techniques described herein and grouped into one or more clusters. The unknown clusters may then be labeled in accordance with the known identities and activities of these sources as derived from the network intelligence database.

As stated above, the present disclosure provides a multi-tiered architecture, or platform of DNS server clusters. In one example, the top tier, or first tier of the platform contains a cluster of one or more DNS authoritative servers to receive and direct DNS queries to one or more DNS authoritative servers in one or more clusters in a second tier of the platform. Subsequent queries for a same domain by a DNS resolver may be sent directly to the second-tier DNS authoritative server(s) until its cache expires. In one example, each DNS authoritative server in the second tier clusters is capable of resolving the same set of domains. Still, each is tasked with servicing DNS queries for different source device statuses/classes. For instance, source devices (e.g., DNS resolvers and/or the clients being serviced thereby) may be assigned a status of: "good," "unknown," or "bad." It should be noted that in other examples, more or less statuses/classes or different labels of the statuses/classes may be utilized.

In one example, the reputations scores, or "statuses," may be determined from the machine learning results described above. For example, it may be determined that the DNS traffic records associated with a DNS resolver are indicative of anomalous DNS traffic. In addition, the same determination may be made for successive DNS traffic records over a period of time. The anomalous DNS traffic may be determined when a distance score from the 2 stage neutral network is greater than a threshold, or when an input aggregate vector associated with DNS traffic records from the DNS resolver is determined to be associated with a cluster that is indicative of anomalous DNS traffic. When a sufficient quantity of anomalous DNS traffic associated with the DNS resolver is detected, the DNS resolver may be reclassified from a status of "good" to a status of "unknown." Similarly, if additional quantities of anomalous DNS traffic associated with the DNS resolver are detected, the status may be further downgraded to "bad." For instance, when a DDoS attack is initiated from a DNS resolver (e.g., of a set of DNS resolvers), it may be re-classified as "bad." When the attack intensity decreases, the algorithm may choose to re-classify the DNS resolver that was previously classified as "bad" as "unknown." Over time it may become "good" again.

In one example, where the anomalous DNS traffic is identified via machine learning as being of a particular type, the contribution or "count" of the detection of the anomalous DNS traffic to the status/reputation score may be different. For instance, if the DNS traffic records indicate a malicious DNS resolver, the contribution to the reputation/status may be (−10). On the other hand, if a DNS resolver is detected as being a source of DNS queries associated with a DDoS attack involving one or more clients of the DNS resolver, the contribution to the reputation/status may be (−5). For example, a threshold for downgrading to a next lower status may be −15, and this threshold is more likely to be reached when the type of anomaly is determined to be more severe, and which may result in a greater contribution to a negative score. It should be noted that a variety of different scoring schemes may be employed in accordance with the present disclosure. Thus, the foregoing example is provided for illustrative purposes only. For instance, in another example, detections of anomalous DNS traffic may result in a positive count until a threshold is reached. In another example, the present disclosure may use a time weighted moving average of a number of anomalies detected and/or score contributions from anomalies detected over a sliding time window.

In one example, statuses of source devices (e.g., DNS resolvers) are fed to the first-tier DNS authoritative server cluster. When a server in the first-tier DNS authoritative server cluster receives a new DNS query from the source device, the server will assign the corresponding class of second-tier DNS authoritative server cluster to process the query. In various examples, the number of tiers in the platform may be varied, and the numbers of servers in each cluster of each layer may also be varied. For instance, a second-tier cluster for queries from "good" source devices may have 10 DNS authoritative servers, while a second-tier cluster for queries from "bad" source devices may have only two DNS authoritative servers. In addition, there may be more clusters in a third tier, a fourth tier, etc. in a hierarchy for handling queries from "good" source devices, while there may be less tiers, less clusters per tier, and/or less servers per cluster in a hierarchy for handling queries for "unknown" or "bad" source devices. In various examples, other resource allocations may be differentiated for the different statuses, such as more or less processors, more or less memory, more or less throughput, more or less add-on services, such as providing "scrubbing" services to queries from "good" source devices, and omitting this additional service for queries from "bad" or "unknown" source devices. This may provide reduced bandwidth and other operational costs related to scrubbing centers. In addition, the present disclosure minimizes the possibility of collateral damage and improves resiliency by allowing some flows to go through scrubbers while others can bypass them.

In one example, the present disclosure may further include providing reputation scores/statuses to DNS resolvers as a way to protect emerging cloud technologies such as DNS over HTTP. For instance, public DNS resolvers may choose to provide different quality of service levels based on the reputation scores/statues of the clients as informed by the present DNS platform. In one example, the present disclosure may be deployed and take advantage of software defined network (SDN) orchestration capabilities to instantiate additional resources at optimal locations in the network. In addition, the present disclosure may be implemented in network service provider core and/or edge computing infrastructure, or in a public cloud, using virtual machines (VMs), containers, or the like for improved resource efficiency. These and other aspects of the present disclosure are described in greater detail below in connection with the examples of FIGS. 1-5.

To further aid in understanding the present disclosure, FIG. 1 illustrates an example system 100 in which examples of the present disclosure for reconfiguring a first-tier domain name system authoritative server to redirect domain name system queries from a source device to a second-tier domain name system authoritative server designated for a second status, in response to identifying a change of the source device from a first status to the second status may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102. The network 102 may be in communication with one or more access networks 120 and 122, and Internet 160. In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth. As further illustrated in FIG. 1, network 102 may include a plurality of DNS resolvers 181-183, a plurality of DNS authoritative servers 191-193, and a processing system 104. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access networks 120 may be in communication with one or more devices 110 and 112. Similarly, access networks 122 may be in communication with one or more devices, e.g., device 114. Access networks 120 and 122 may transmit and receive communications between devices 110, 112, and 114, between devices 110, 112, and 114, and servers 116, servers 118, DNS resolvers 181-183, other components of network 102, devices reachable via the Internet in general, and so forth. In one example, each of devices 110, 112, and 114 may comprise any single device or combination of devices that may comprise a user endpoint device. For example, the devices 110, 112, and 114 may each comprise a mobile device, a cellular smart phone, a laptop, a tablet computer, a desktop computer, an application server, a bank or cluster of such devices, and the like. In one example, any of devices 110, 112, and 114 may comprise sensor devices with wireless networking hardware, e.g., Internet of Things (IoT) devices, for gathering measurements of an environment, uploading the measurements to one or more servers or other devices, and so forth.

In one example, the access network 122 may also be in communication with one or more servers 116. Similarly, one or more servers 118 may be accessible to devices 110, 112, and 114, to servers 116, and so forth via Internet 160 in general. Each of the one or more servers 116 and one or more servers 118 may be associated with one or more IP addresses to enable communications with other devices via one or more networks. Each of the server(s) 116 and server(s) 118 may be associated with, for example, a merchant, a service business, a news source, a weather source, a school, a college or university, or other educational content providers, a social media site, a content distribution network, a cloud storage provider, a cloud computing application host, and so forth.

Figure 5:
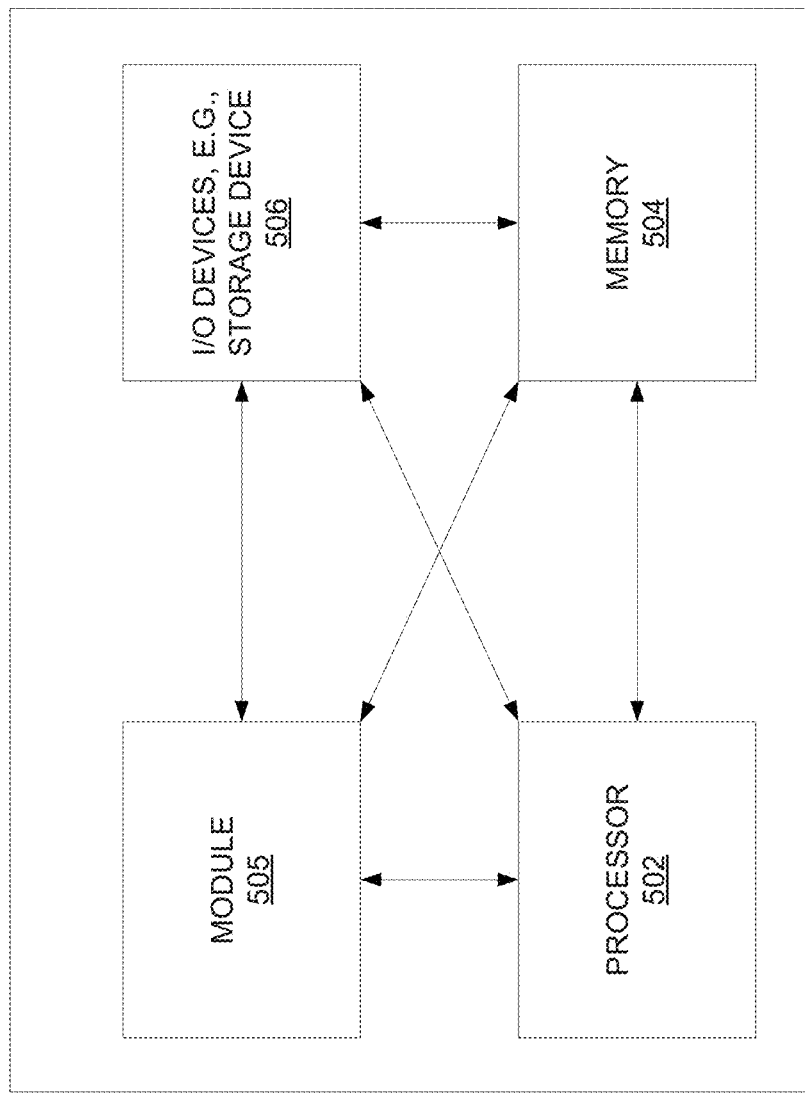
FIG. 5 illustrates a high level block diagram of a computing device specifically programmed to perform the steps, functions, blocks and/or operations described herein.

In accordance with the present disclosure, each of server(s) 116 and server(s) 118 may comprise a computing system or server, such as computing system 500 depicted in FIG. 5, and may be configured to provide one or more operations or functions in connection with examples of the present disclosure for reconfiguring a first-tier domain name system authoritative server to redirect domain name system queries from a source device to a second-tier domain name system authoritative server designated for a second status, in response to identifying a change of the source device from a first status to the second status, as described herein. For instance, although examples of the present disclosure are described primarily in connection with DNS traffic records, in other, further, and different examples, network traffic records may relate to other types of network traffic, such as: server connection request messages at one or more servers of one or more domains, e.g., transmission control protocol (TCP) SYN/ACK messaging, Uniform Datagram Protocol (UDP) messaging, IP packets for streaming video, streaming audio, or general Internet traffic, and so forth. Accordingly, in one example, network traffic data may be gathered and/or provided by server(s) 116 and/or server(s) 118. For instance, server(s) 116 and/or server(s) 118 may maintain server logs and may provide the servers logs or log summaries periodically or by request, may transmit exception messages or error messages, and so forth (e.g., to processing system 104).

In accordance with the present disclosure, processing system 104 may comprise one or more physical devices, e.g., one or more computing systems or servers, such as computing system 500 depicted in FIG. 5, and may be configured to provide one or more operations for reconfiguring a first-tier domain name system authoritative server to redirect domain name system queries from a source device to a second-tier domain name system authoritative server designated for a second status, in response to identifying a change of the source device from a first status to the second status, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

In one example, database (DB) 106 may comprise a physical storage device integrated with processing system 104 (e.g., a database server), or attached or coupled to the processing system 104, to store various types of information in support of systems for reconfiguring a first-tier domain name system authoritative server to redirect domain name system queries from a source device to a second-tier domain name system authoritative server designated for a second status, in response to identifying a change of the source device from a first status to the second status, in accordance with the present disclosure. For example, DB 106 may store network traffic data, or other records from which network traffic data may be derived, may store reputation scores or values for various sources, such as devices 110, 112, 114, DNS resolvers 181-183, and so forth, may store encoder-decoder neural network instruction set(s), training data, testing data, and so forth for detecting anomalous network traffic data records (e.g., anomalous DNS traffic records), may store instruction set(s) and related data records for normalized distance-based clustering, and so on. In one example, processing system 104 may load instructions into a memory, or one or more distributed memory units, and execute the instructions for reconfiguring a first-tier domain name system authoritative server to redirect domain name system queries from a source device to a second-tier domain name system authoritative server designated for a second status, in response to identifying a change of the source device from a first status to the second status, as described herein. An example method for reconfiguring a first-tier domain name system authoritative server to redirect domain name system queries from a source device to a second-tier domain name system authoritative server designated for a second status, in response to identifying a change of the source device from a first status to the second status is described in greater detail below in connection with FIG. 4.

In one example, processing system 104, DNS resolvers 181-183, and/or DNS authoritative server clusters 190-193 may operate in a distributed and/or coordinated manner to perform various steps, functions, and/or operations described herein. To illustrate, processing system 104 may obtain DNS traffic records (e.g., from DNS authoritative server clusters 190-193 and/or from DNS resolvers 181-183, from DB 106, etc.), generate aggregate vectors comprising a plurality of features from the DNS traffic records, e.g., one minute records per DNS resolver, and train an encoder-decoder neural network with the aggregate vectors, e.g., to identify "normal" aggregate vectors (which represent "normal" DNS traffic records). The DNS traffic records may relate to DNS queries from devices 110, 112, and/or 114, or server(s) 116 to any one or more of DNS resolvers 181-183, may relate to DNS queries forwarded by DNS resolvers 181-183 to any one or more of DNS authoritative server clusters 190-193, and so forth. For instance, device 112 may select and/or be assigned DNS resolver 181, device 110 may select and/or be assigned DNS resolver 182, device 114 and server(s) 116 may be assigned DNS resolver 183, and so forth.

In an illustrative example, device 110 may seek to obtain access to a webpage for a banking service, which may be hosted on one of the servers 118, but which may be unknown to the device 110 and/or a user of the device 110. To access the webpage, a DNS query from device 110 may comprise, for example, the domain name "examplebank.com" and may be submitted to DNS resolver 182. DNS resolver 182 may provide the current IP address for device 110 to access examplebank.com if there is an associated record in a cache at DNS resolver 182. For instance, DNS resolver 182 may maintain records for domains that have been recently queried (e.g., within the last 12 hours, the last 24 hours, etc.), may maintain records for certain designated domains (e.g., the most popular 10,000 and/or the 10,000 most queried domains over the last six months), and so forth. Otherwise, DNS resolver 182 may seek the IP address from one or more other DNS resolvers or from a DNS authoritative server.

It should be noted that DNS architectures may include multiple layers (e.g., hierarchical layers) of DNS resolvers with one or more DNS authoritative servers providing definitive records for domains respectively assigned to the different DNS authoritative servers. In one example, DNS resolvers 181-183 may follow a recursive process for obtaining an IP address for a submitted query, by accessing other DNS resolvers and/or DNS authoritative servers. However, for ease of illustration, FIG. 1 illustrates a single layer of DNS resolvers 181-183. Thus, if DNS resolver 182 does not have a record for examplebank.com, the DNS resolver 182 may then submit the query to one or more DNS authoritative servers (e.g., one or more of DNS authoritative server clusters 190-193.

DNS resolver 182 may, by default, forward unresolved DNS queries to DNS authoritative server cluster 190 (e.g., first tier cluster). In addition, one or more DNS authoritative servers in the first-tier DNS authoritative server cluster 190 may be configured to forward or redirect queries from DNS resolvers (including DNS resolver 182) based upon statuses, or reputation scores of the DNS resolvers to one of the second tier DNS server clusters 191-193. For instance, if DNS resolver 182 has a status of "good," queries from DNS resolver 182 received at the first-tier DNS authoritative server cluster 190 may be forwarded to the second-tier DNS authoritative server cluster 191 for handling DNS queries for "good" DNS resolvers. Assuming one of the DNS authoritative servers in the second-tier DNS authoritative server cluster 191 possesses the record for examplebank.com, the associated IP address may then be returned to DNS resolver 182 and on to device 110 by DNS resolver 182.

It should be noted that various techniques may be employed to provide load balancing among different servers for examplebank.com and other domains. For instance, DNS queries for examplebank.com that originate in a first geographic area, from a first set of IP subnet addresses, etc. may be directed to a first server accessible via a first IP address, while DNS queries for examplebank.com that originate in a different geographic area, a different set of IP subnet addresses, etc. may be directed to a second server accessible via a second IP address. In other words, the first-tier DNS authoritative server cluster 190 may have different DNS authoritative servers responding to queries from different regions. Similarly, the second-tier DNS authoritative server clusters 191-193 may include different servers for servicing DNS queries from different geographic areas, different sets of IP subnet addresses, etc. In still another example, each of the second tier DNS authoritative server clusters 191-193 may comprise a separate hierarchy of DNS authoritative servers, but containing records for the same sets of domains. For instance, servers within the second-tier DNS authoritative server cluster 193 may be configured to include zone delegation such that a DNS query from one of DNS resolvers 181-183 may still be referred among DNS authoritative servers within the second-tier DNS authoritative server cluster 193, and similarly for second-tier DNS authoritative server clusters 191 and 192.

Other examples may involve responding to DNS queries and redirecting to different IP addresses (which may identify different servers or other target devices) based upon time of day, current load at a main server, the type of requesting device, the capabilities of such a requesting device, and so forth. Again it should be noted these types of differentiations may still be bounded by the DNS resolver being redirected to a server that is part of a cluster assigned to service DNS queries from DNS resolvers with the same status/reputation score. These types of differentiations may all be provided by different configuration settings maintained by DNS authoritative servers in the first tier DNS authoritative server cluster 190. In addition, these types of differentiations may also be provided by servers in the respective second tier DNS authoritative server clusters 191-193. For instance, DNS authoritative servers in the second tier DNS authoritative server cluster 192 may be assigned to service DNS queries from DNS resolvers having a status of "unknown" from different respective geographic areas. However, these DNS authoritative servers may also be configured to load-balance among themselves. Alternatively, or in addition, at different times of day, one or more of these DNS authoritative servers may be made unavailable, while others of the DNS authoritative servers in second tier DNS authoritative server cluster 192 may process DNS queries from DNS resolvers from additional geographic areas. In one example, these types of differentiations may also be supported by DNS resolvers 181-183 (e.g., for those domains for which the DNS resolvers 181-183 may currently maintain records).

The foregoing describes just one example of a DNS query and response. Thus, it should be understood that DNS resolvers 181-183 and the DNS authoritative server clusters 190-193 may process a large number of additional DNS queries from devices 110, 112, and 114, and from other clients on any given day, any given week, etc. DNS queries are for a variety of purposes including accessing webpages, loading advertisements or other third party content to webpages, directing IoT sensor devices to storage locations to upload sensor data, obtaining and verifying cryptographic certificates, retrieving segments of streaming media from different content servers of a content distribution network (CDN), and so forth.

Figure 2:
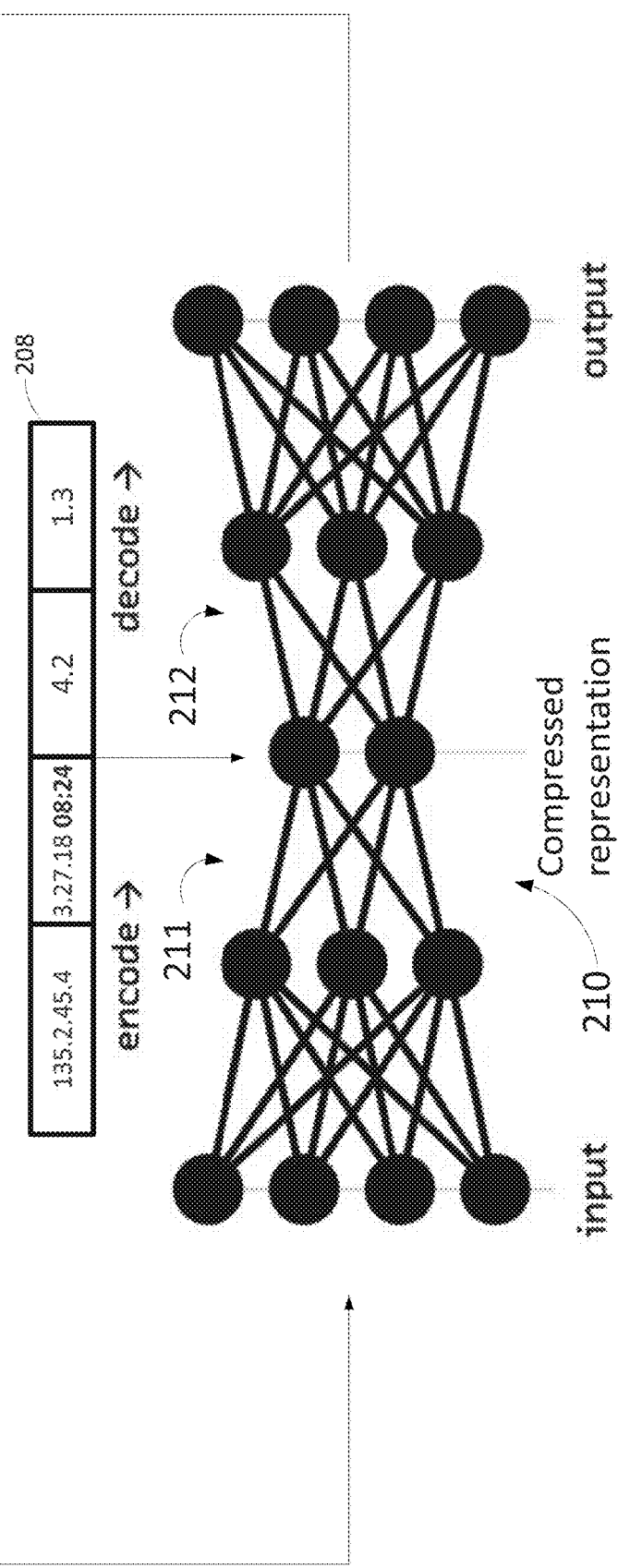
FIG. 2 illustrates an example encoder-decoder neural network process in accordance with the present disclosure.

All of this DNS traffic may generate a variety of DNS traffic records by DNS resolvers 181-183 and/or DNS authoritative server clusters 190-193. For instance, there may be tens of billions of DNS traffic records generated in network 102 each day. In one example, for scalability and efficiency, these DNS traffic records may be combined, summarized, averaged, and/or otherwise pre-processed to generate aggregate vectors. For instance, from over 20 billion daily DNS traffic records, several million aggregate vectors may be generated. In one example, each aggregate vector may be associated with one DNS resolver and may relate to DNS traffic records for a given time period, e.g., one minute of DNS traffic records, two minutes of DNS traffic records, etc. In addition, each aggregate vector may have a number of fields, e.g., 20 fields, 50 fields, 60 fields, 100 fields, etc. All of these aggregate vectors may be used to train the encoder-decoder neural network (e.g., to encode and decode "normal" aggregate vectors. An example aggregate vector is illustrated in FIG. 2 and described in greater detail below.

Once the encoder-decoder neural network is trained, the processing system 104 may then obtain additional DNS traffic records, generate input aggregate vectors, apply the encoder-decoder neural network to the input aggregate vectors, calculate distances between the input aggregate vectors and respective reconstructed vectors from the decoder portion of the encoder-decoder neural network, and determine whether the input aggregate vectors represent normal DNS traffic records or anomalous DNS traffic records depending upon the distance. For instance, the (Euclidean) distance may represent a "score," where for a lower score (closer distance), the encoder-decoder neural network may be considered to accurately model an input aggregate vector. For a higher score (farther distance), the encoder-decoder neural network may be considered to poorly model the input aggregate vector, thus identifying an anomalous input aggregate vector (and thus also identifying anomalous DNS traffic records from which the input aggregate vector is derived). The processing system 104 may apply a threshold, such as a scaled distance of 0.2 (scaled from 0 to 1) for which any distance greater than 0.2 may be considered to be associated with an anomaly, and any distance 0.2 or closer may be considered to be associated with normal traffic. It should be noted that in other examples, a different scaled distance threshold may be applied (e.g., 0.1, 0.25, 0.32, etc.), a non-scaled distance threshold may be applied, and so forth.

In one example, for anomalous DNS traffic records identified by processing system 104 (e.g., when the distance/score exceeds a threshold), the processing system 104 may apply one or more remedial actions. For instance, the processing system 104 may maintain a threshold whereby the detection of one or more anomalous DNS traffic records associated with a DNS resolver may result in the DNS resolver being downgraded from a first status to a second status (such as from "good" to "unknown," or from "unknown" to "bad." In addition, when the processing system 104 determines that a status of a DNS resolver has changed, the processing system 104 may notify the first tier DNS authoritative server cluster 190 and/or may reconfigure the first tier DNS authoritative server cluster 190 such that one or more DNS authoritative servers in the cluster will redirect DNS queries from the DNS resolver to a second tier DNS authoritative server cluster 191-193 commensurate with the new status of the DNS resolver.

As just one example, DNS resolver 181 may be detected to be a source of anomalous DNS traffic records. For instance, device 112 may direct DNS queries to DNS resolver 181, or may have DNS queries directed to DNS resolver 181, and may be sending a large volume of queries and/or a large number of queries in fast succession, e.g., as part of malicious scanning activity.

The scanning activity may be an attempt to learn a domain structure for a large entity, such as a bank, including identifying valid sub-domains, the IP addresses associated with the sub-domains, and so forth. The DNS resolver 181 may be configured to send/forward DNS queries from clients to one or more DNS authoritative servers in the first tier DNS authoritative server cluster 190 (which may be designated as DNS authoritative server(s) for the domain). Thus, the anomalous DNS traffic records (for the malicious scan activity) may comprise the DNS queries from DNS resolver 181 to DNS authoritative server 190 which may be detected via the encoder-decoder neural network as described. It should be noted that there may be additional DNS queries from DNS resolver 181 to DNS authoritative server 190 for non-malicious clients. However, due to the large volume of queries for the particular malicious client (device 112), the anomalous DNS traffic records may be apparent from the input aggregate vector(s) associated with DNS resolver 181.

In any event, when the anomalous DNS traffic records are identified as being associated with DNS resolver 181, in one example processing system 104 may instruct/reconfigure the first tier DNS authoritative server cluster 190 to instead send DNS queries to DNS authoritative servers in the second tier DNS authoritative server cluster 192, e.g., for DNS queries from DNS resolvers having a status of "unknown." For instance, at this point, the processing system 104 may identify that an anomaly is detected, but may not know if the anomaly is a scan activity or other types of malicious activity, or if the anomaly is benign but not representative of "normal" traffic.

In one example, the processing system 104 may further perform clustering operations to identify clusters of anomalous network traffic data (e.g., DNS traffic records), and to associate the clusters with particular types of malicious activity or other types of anomalies. In one example, the clustering, e.g., normalized distance-based clustering, may be applied to samples of network traffic data comprising compressed vector representations of input aggregate vectors generated via the encoder-decoder neural network. In one example, the encoder-decoder neural network encodes the input aggregate vectors (e.g., derived from DNS traffic records) as compressed vector representations and decodes the compressed vector representations as reconstructed vectors. For instance, the processing system 104 may be configured to generate compressed vector representations via the encoder-decoder neural network comprising two features, four features, seven features, etc., whereas the input aggregate vectors may have a much greater number of features, such as 50 features, 60 features, 100 features, etc.

In one example, the clusters may be plotted in a graph and provided to one or more entities associated with network 102, such as network technicians, subject matter experts, etc. For instance, the graph may comprise a plurality of dimensions related to the number of features of the compressed vector representation(s). In one example, the clusters may be labeled automatically by processing system 104. For instance, DB 106 may store compressed vector representations that may be known to represent input vectors relating to particular types of anomalies. Thus, the processing system 104 may associate certain clusters with certain types of anomalies. In another example, the clusters may be labeled by network technicians or others.

Once labeled, processing system 104 may then evaluate the status of the DNS resolver associated with the DNS traffic in a manner specific to certain types of attacks or other anomalous traffic. For instance, the encoder-decoder neural network may be applied to an input aggregate vector for new network traffic data, the compressed vector representation may be generated and clustered, and then depending upon the cluster to which the compressed vector representation is assigned, the processing system 104 may adjust the status of the DNS resolver in a manner specific to the type of anomaly. For instance, if the cluster is labeled as a DDoS on a DNS authoritative server, the contribution to the status/reputation score of the DNS resolver may be (−5), whereas if the cluster identifies a malicious DNS resolver, the contribution to the status/reputation score may be (−10). In one example, the identification of anomalous network traffic data (e.g., DNS traffic records) via the association of compressed vector representations with clusters of known anomaly types may be used as an alternative or in addition to the identification of anomalous network traffic data (e.g., anomalous DNS traffic records) through distance comparisons between input aggregate vectors and the reconstructed vectors output via the encoder-decoder neural network as described above. In addition, as noted above, when processing system 104 determines that a status of a DNS resolver has changed, the processing system 104 may notify the first tier DNS authoritative server cluster 190 and/or may reconfigure the first tier DNS authoritative server cluster 190 such that one or more DNS authoritative servers in the cluster will redirect DNS queries from the DNS resolver to a second tier DNS authoritative server cluster 191-193 commensurate with the new status of the DNS resolver.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet 160 may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. For example, device 114 and server(s) 116 may communicate with network 102 via different access networks, devices 110 and 112 may communicate with network 102 via different access networks, and so forth. In still another example, one or more of DNS resolvers 181-183 may be deployed external to network 102 (e.g., a public DNS resolver), or the system 100 may include one or more additional DNS resolvers external to network 102, each of which may be similarly assigned a status/reputation score by the processing system 104 and which may have DNS queries differentially routed by first tier DNS authoritative server cluster 190 to one of second tier DNS authoritative server clusters 191-193 depending upon the assigned status. Thus, these and other modifications are all contemplated within the scope of the present disclosure.

FIG. 2 illustrates an example encoder-decoder neural network process 200. As illustrated in FIG. 2, an encoder-decoder neural network 210 (e.g., an autoencoder) may include an encoder portion 211 and a decoder portion 212, which may be symmetric and may include a number of layers and a number of nodes in each layer. The encoder-decoder neural network 210 may take an input vector 201, encode the input vector 201 into a compressed vector representation 208, and decode the compressed vector representation 208 into a reconstructed vector 202. The input vector 201 may have a plurality of features, e.g., nine (9) features, 50 features, 60 features, 100 features, etc., which may be aggregated from DNS traffic records in a network. Example types of features are indicated in the feature key 205 and may include: a DNS resolver IP address for which the DNS traffic records are aggregated, a time block from which the DNS traffic records are aggregated, a number of queries (e.g., in thousands) processed by the DNS resolver in the time period, a number of DNS authoritative servers contacted by the DNS resolver in the time period, a number of unique clients submitted queries to the DNS resolver in the time period, a number of distinct top level domains queried in the time period, a number of distinct second level domains queried in the time period, a number of DNS resolvers serviced by the top DNS authoritative server contacted by the DNS resolver in the time period, and a number of queries submitted to the DNS authoritative server by the DNS resolver in the time period. The foregoing relates to DNS traffic records and represents just some of the example feature types that may be included in an aggregate vector in accordance with the present disclosure. For instance, other examples may include more or less features, different features, etc. In addition, other examples may relate to other types of network traffic and thus may include different feature types that are pertinent to such types of network traffic.

The encoder-decoder neural network 210 may be trained with a plurality of aggregate vectors of a similar nature to aggregate vector 201, where for each of the plurality of aggregate vectors, nodes in each respective layer of the encoder portion 211 and the decoder portion 212 are updated via a feedforward pass and a backpropagation of a deviation measure between the aggregate vector and a respective reconstructed vector that is generated via the decoder portion 212 (e.g., a distance/score between the input vector and the reconstructed vector). In one example, the backpropagation is to collectively minimize the deviation measures/ reconstruction errors. For example, the plurality of aggregate vectors may comprise training data that is representative of "normal" network traffic data.

Once trained, the encoder-decoder neural network 210 may be applied to the input vector 201 to create the compressed vector representation 208, which may have just two features (excluding the DNS resolver IP address and the time information), having the values 4.2 and 1.3, respectively. It should be noted that these feature and values may have no apparent real-world meaning that is understandable to a network technician or other humans interpreting this information. Nevertheless, the compressed vector representation 208 may be used for clustering and identification of anomaly type(s) as described herein.

In addition, the compressed vector representation 208 may also be used to generate the reconstructed vector 202 via the decoder portion 212 of the encoder-decoder neural network 210. The reconstructed vector 202 has the same field types as input vector 201. When the encoder-decoder neural network 210 accurately models the input vector 201, the reconstructed vector 202 should be identical or close to the input vector 201. In such case, the distance between the input vector 201 and the reconstructed vector 202 should be zero or near zero. On the other hand, when the distance is greater, the encoder-decoder neural network 210 may be considered to poorly model the input vector 201, in which case the input vector 201 may be considered an anomaly.

Figure 3:
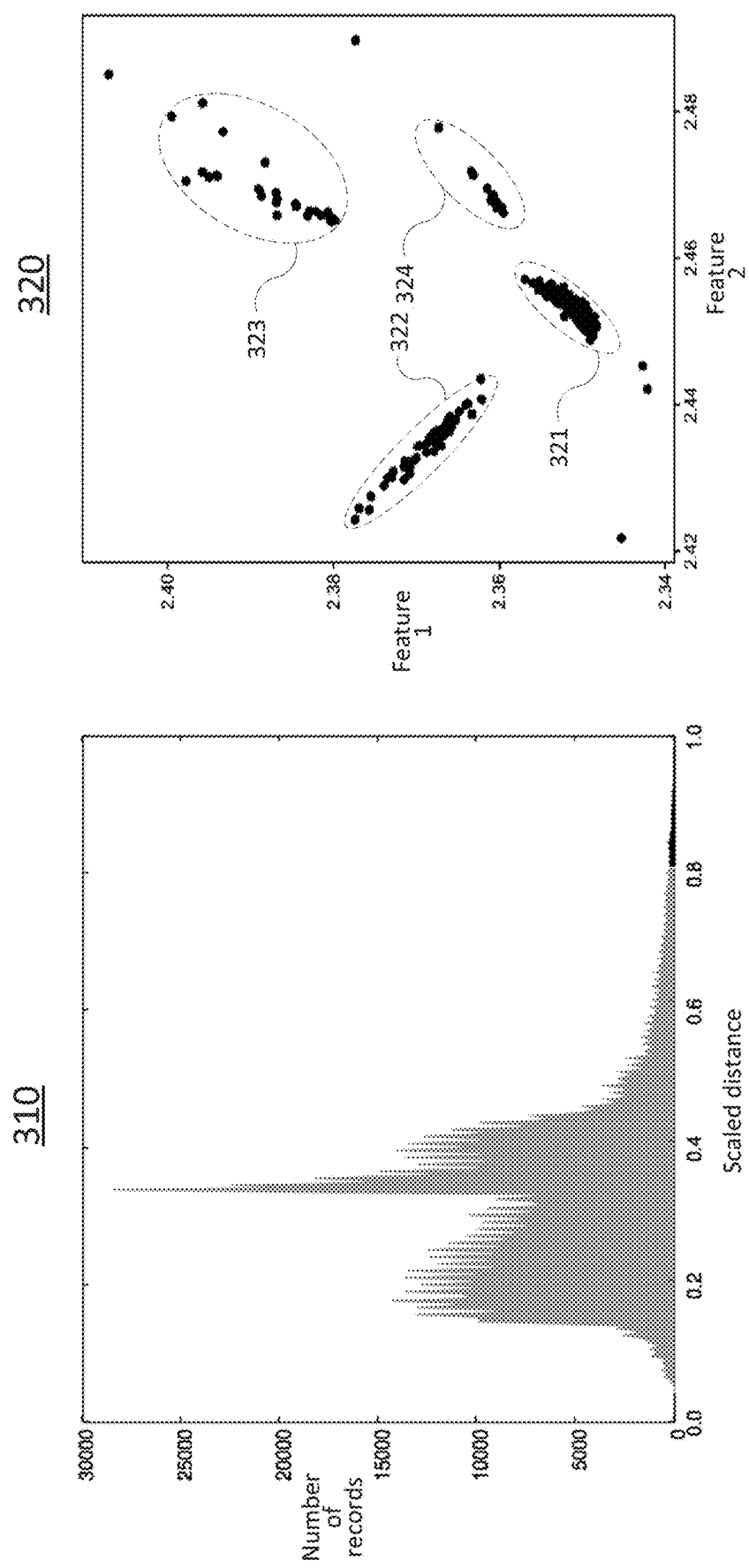
FIG. 3 illustrates an example graph of encoder-decoder neural network accuracy for input vectors derived from domain name system traffic records and an example graph of encoder-decoder neural network compressed vector representations of input vectors derived from domain name system traffic records.

FIG. 3 illustrates an example graph 310 of encoder-decoder neural network accuracy for input vectors derived from DNS traffic records and an example graph 320 of encoder-decoder neural network compressed vector representations of input vectors derived from DNS traffic records. In the graph 310, the vertical axis indicates a number of input vectors (number of records), and the horizontal axis indicates the scaled distance/score between each of the input vectors and a respective reconstructed vector generated via an encoder-decoder neural network (such as encoder-decoder neural network 210 of FIG. 2). In the present example, any distance/score greater than 0.8 may be considered to be an anomaly. As can be seen, the vast majority of input vectors (and hence the DNS traffic records or other network traffic data from which such input vectors are derived) are considered "normal," whereas the anomalies are rare events.

In the graph 320, the vertical axis may represent a first feature type and the horizontal axis may represent a second feature type of compressed vector representations generated via an encoder-decoder neural network. In the present example, the compressed vector representations may each comprise two features. For instance, the compressed vector representations may be of the same form as compressed vector representation 208 of FIG. 2 (with two features, exclusive of the DNS resolver IP and time fields). As can be seen in the graph 320, there are four clusters 321-324, with a few outliers (which may be considered as single element clusters). In the present example, the majority of compressed vector representations (e.g., greater than 99.9 percent, greater than 99.99 percent, etc.) may be grouped within cluster 321, which may represent "normal" network traffic records (e.g., normal DNS traffic records), whereas lesser numbers of compressed vector representations may fall within clusters 322-324, respectively. In one example, clusters 321-324 may be identified manually, e.g., by visual inspection. In another example, clusters 321-324 may be automatically identified via a clustering algorithm. For instance, clusters 321-324 may be automatically identified via a normalized distance-based clustering process.

Each of the different clusters 322-324 may represent a different type of anomaly. For instance, cluster 322 may represent a DDoS on a DNS authoritative server, cluster 323 may represent scanning and probing activity, and cluster 324 may represent traffic relating to DNS resolver cache poisoning. In one example, the largest cluster 321 may be automatically labeled as being associated with "normal" network traffic data. The other clusters 322-324 may then be identified as representing anomalous network traffic data. In one example, the other clusters 322-324 may also be labeled as particular types of anomalies. For instance, compressed vector representations that are the samples for clustering may be known to represent input vectors relating the network traffic data from particular sources to particular destinations, etc. To illustrate, a network intelligence database may be maintained wherein certain sources (e.g., IP addresses) have been identified as being associated with particular types of anomalous traffic. The unknown clusters may then be labeled in accordance with the known identities and activities of these sources as derived from the network intelligence database. Alternatively, or in addition, a network technician or another person may manually inspect one or more of the clusters, the input vectors associated with the compressed vector representations grouped in one or more of the clusters, etc. to determine characteristics of the input vectors and/or the network traffic records (e.g., DNS traffic records) from which the input vectors may be derived, and to identify one or more possible anomaly types. In one example, the network traffic records, the input aggregate vectors, the clusters, and other data may all be maintained by a processing system and/or a database and made available to various users via respective user devices.

Figure 4:
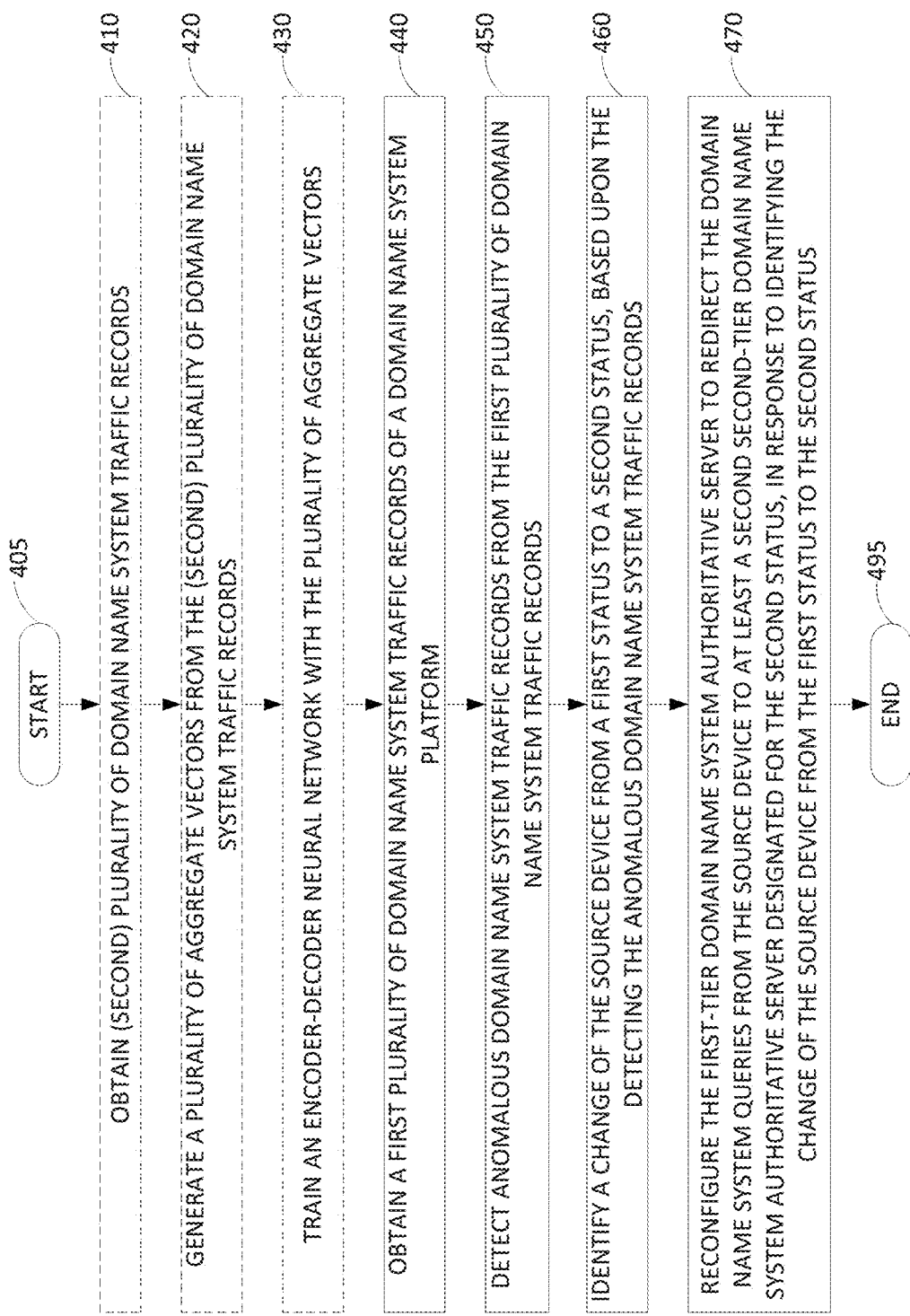
FIG. 4 illustrates a flowchart of an example method for reconfiguring a first-tier domain name system authoritative server to redirect domain name system queries from a source device to a second-tier domain name system authoritative server designated for a second status, in response to identifying a change of the source device from a first status to the second status.

FIG. 4 illustrates a flowchart of an example method 400 for reconfiguring a first-tier domain name system authoritative server to redirect domain name system queries from a source device to a second-tier domain name system authoritative server designated for a second status, in response to identifying a change of the source device from a first status to the second status, in accordance with the present disclosure. In one example, the method 400 is performed by a component of the system 100 of FIG. 1, such as by processing system 104, and/or any one or more components thereof (e.g., a processor, or processors, performing operations stored in and loaded from a memory), or by processing system 104, in conjunction with one or more other devices, such as DB 106, DNS resolvers 181-183, DNS authoritative server clusters 190-193, and so forth. In one example, the steps, functions, or operations of the method 400 may be performed by a computing device or system 500, and/or processor 502 as described in connection with FIG. 5 below. For instance, the computing device or system 500 may represent any one or more components of a server and/or processing system 104 in FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and may proceed to optional step 410 or to step 440.

At optional step 410, the processing system may obtain a plurality of DNS traffic records (e.g., a "second" plurality of DNS traffic records). In one example, the second plurality of DNS traffic records are associated with DNS queries from at least one DNS resolver to at least one DNS authoritative server (e.g., a first-tier DNS authoritative server, a second-tier DNS authoritative server, etc.). For instance, the DNS traffic records may relate to DNS queries and replies between a client and a DNS resolver, between DNS resolvers of different layers, between a DNS resolver and a DNS authoritative server of any tier, and so forth.

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At optional step 420, the processing system may generate the plurality of aggregate vectors from the second plurality of DNS traffic records, where each of the plurality of aggregate vectors comprises a plurality of features derived from the second plurality of DNS traffic records. In one example, the plurality of aggregate vectors may comprise aggregate information associated with DNS traffic for at least one DNS resolver over a designated time period. For instance, the aggregate information may include, for the one of the at least one DNS resolver and for the designated time period, at least one of: a number of queries received, a number of queries sent, a number of DNS authoritative servers contacted, an average time-to-live value for the queries received, an average domain name length in the queries received, a number of unique top level domains included in the queries received, or a number of unique second level domains included in the queries received. Alternatively, or in addition, the aggregate information may include, for the one of the at least one DNS resolver and for the designated time period, at least one of a number of DNS resolvers contacting a DNS authoritative server that is most contacted by the one of the at least one DNS resolver, or a number of queries received by the DNS authoritative server that is most contacted by the one of the at least one DNS resolver.

At optional step 430, the processing system may train an encoder-decoder neural network (e.g., an autoencoder) with the plurality of aggregate vectors. For instance, in one example, the encoder-decoder neural network is to encode the plurality of input aggregate vectors as compressed vector representations and to decode the compressed vector representations as reconstructed vectors. In one example, the training comprises, for each of the plurality of aggregate vectors, a feedforward pass and a backpropagation of a deviation measure. For instance, the deviation measure may comprise a distance calculation between one of the aggregate vectors and a respective reconstructed vector generated via the encoder-decoder neural network. In one example, the encoder-decoder neural network comprises between five layers and nine layers. In one example, the compressed vector representation comprises between two features and four features.

At step 440, the processing system obtains a plurality of DNS traffic records of a DNS platform (e.g., a "first" plurality of DNS traffic records), the first plurality of DNS traffic records associated with a source device that is submitting DNS queries, the source device having a first status, where a first-tier DNS authoritative server (e.g., of a first-tier DNS authoritative server cluster) of the DNS platform is configured to forward the DNS queries from the source device to at least a first second-tier DNS authoritative server (e.g., of a second-tier DNS authoritative server cluster) of the DNS platform designated for the first status. The source device may comprise a DNS resolver or a client of a DNS resolver, for example. In one example, the first plurality of DNS traffic records is associated with DNS queries from at least one DNS resolver to at least one DNS authoritative server (e.g., a first-tier DNS authoritative server, a second-tier DNS authoritative server, etc.).

At step 450, the processing system detects anomalous DNS traffic records from the first plurality of DNS traffic records. For example, step 450 may include generating an input aggregate vector from the first plurality of DNS traffic records, the input aggregate vector comprising a plurality of features derived from the first plurality of DNS traffic records, applying an encoder-decoder neural network to the input aggregate vector to generate a reconstructed vector (e.g., where the encoder-decoder neural network may be trained with a plurality of aggregate vectors generated from the second plurality of DNS traffic records in accordance with optional steps 410-430 above), and calculating a distance between the input aggregate vector and the reconstructed vector. For instance, the distance may represent a reconstruction error comprising the difference (e.g., a Euclidean distance) between the input aggregate vector and the reconstructed vector that is output from the encoder-decoder neural network.

In one example, the encoder-decoder neural network is to encode the input aggregate vector as a compressed vector representation and to decode the compressed vector representation as the reconstructed vector. In addition, the input aggregate vector may comprise aggregate information associated with DNS traffic for one of the at least one DNS resolver over a designated time period. The input aggregate vector may comprise the same fields or types of information as the plurality of aggregate vectors mentioned above in connection with optional step 420. In one example, the processing system detects that the first plurality of DNS traffic records comprises the anomalous DNS traffic records when the distance is greater than a threshold. It should also be noted that this can be just one of many anomalous DNS traffic records detected from different input aggregate vectors generated from the first plurality of DNS traffic records.

In one example, step 450 may further include identifying a plurality of clusters from a plurality of compressed vector representations associated with each of a plurality of input aggregate vectors, the plurality of input aggregate vectors including the input aggregate vector (the plurality of input aggregate vectors may comprise the plurality of input aggregate vectors mentioned above in connection with optional step 420). In one example, the plurality of clusters is identified in a feature space having a plurality of dimensions in accordance with the plurality of compressed vector representations. In one example, the clusters may be generated via a normalized distance-based clustering. In addition, the detecting the anomalous DNS traffic records may further include obtaining a first label for a first cluster of the plurality of clusters, the first label associated with a first DNS traffic anomaly type, and detecting that the input aggregate vector is associated with the first cluster. In other words, the anomalous DNS traffic records may be detected from the first plurality of DNS traffic records when it is detected that the input aggregate vector is associated with the first cluster. To illustrate, the largest cluster may be automatically labeled as being associated with "normal" network traffic data. One or more other clusters may then be identified as representing anomalous DNS traffic records. In one example, compressed vector representations that are the samples for clustering may be known to relate to DNS traffic from particular sources to particular destinations, etc., where certain sources (e.g., IP addresses) have been identified as being associated with particular types of anomalous traffic, such as known botnet command and control servers, known sources of scan and probe attacks, known DNS authoritative server DDoS attack sources, and so forth.

At step 460, the processing system identifies a change of the source device from a first status to a second status, based upon the detecting the anomalous DNS traffic records. In one example, the first status is one of at least two statuses, and the second status comprises a different one of the at least two statuses. In one example, the change of the source device from a first status to a second status is identified when more than a threshold number of anomalous DNS traffic records are detected from the first plurality of DNS traffic records. For example, a threshold number may be reached for change in status when a given number of input aggregate vectors are detected to be over the distance threshold described above in step 450. Alternatively, or in addition, the change of the source device from a first status to a second status may be identified when more than a threshold number of input aggregate vectors generated from DNS traffic records associated with the source device are detected to be associated with the first cluster. For instance, the change of status may be from "good" to "unknown," "good" to "bad," "unknown" to "bad," etc. However, it should be noted that step 460 may include identifying a change in status from a lower status/reputation to a higher status. For instance, after a passage of time in which the DNS traffic records associated with a source device are not indicative of anomalous DNS traffic, the status of the source device may be switched from "bad" to "unknown," from "unknown" to "good," and so forth.

At step 470, the processing system reconfigures the first-tier DNS authoritative server to redirect the DNS queries from the source device to at least a second, second-tier DNS authoritative server designated for the second status, in response to identifying the change of the source device from the first status to the second status. In one example, the at least the first, second-tier DNS authoritative server and the at least the second, second-tier DNS authoritative server comprise different resource allocations with different processing capabilities. For instance, the at least the first, second-tier DNS authoritative server and the at least the second, second-tier DNS authoritative server have different numbers of processors (e.g., including different numbers of second-tier DNS authoritative servers in the respective server clusters, different number of cores or processors per server, different numbers of overall processors/cores, etc.), different quantities of memory, different rates of responding to DNS queries, different abilities to apply scrubber criteria to DNS queries, and so forth.

Following step 470, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400 for additional DNS traffic records, e.g., to identify anomalous DNS traffic records, change the status(es) of one or more source devices, and so forth. In one example, the step 470 may include reconfiguring a plurality of first-tier DNS authoritative servers in a first-tier DNS authoritative server cluster of the DNS platform. In other words, each of the first-tier DNS authoritative servers may be similarly configured to redirect DNS queries from the source device to one or more second-tier DNS authoritative servers in a second-tier DNS authoritative server cluster associated with the new status of the client device. In one example, the method 400 may include detecting a passage of time during which anomalous DNS traffic records are not observed, and changing the status from the second status back to the first status (e.g., from a lesser status/reputation back to a higher status reputation). In another example, the method 400 may be expanded to include updating the encoder-decoder neural network, e.g., retraining the encoder-decoder neural network with the input aggregate vector and/or additional aggregate vectors derived from additional DNS traffic records.

In another example, the method 400 may include configuring first tier DNS authoritative server(s) to redirect DNS queries from "good" source devices to a scrubbing center (which may redirect a DNS query to a second tier DNS authoritative server for "good" source devices when the DNS query is not filtered-out by the scrubber criteria). In another example, the method 400 may further include applying at least one additional remedial action, such as notifying a DNS resolver of a change in status of the source device (e.g., the DNS resolver and/or client thereof), blocking DNS traffic from one or more clients, blocking, dropping, or redirecting additional types of traffic from the client(s) and/or DNS resolver(s) (e.g., non-DNS traffic), and so forth. Other remedial actions may include (e.g., for source devices assigned a status of "bad"): sandboxing, providing a response with a different IP address that the IP address that would normally be returned for the query, e.g., redirecting back to the client requestor, redirecting to a warning page maintained by DNS provider, etc. In still another example, the method 400 may include instantiating additional DNS authoritative servers (e.g., as VMs, containers, or the like), disabling DNS authoritative servers, and so forth in response to the changing numbers of source devices having different statuses. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1, or described in connection with the method 400 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for reconfiguring a first-tier domain name system authoritative server to redirect domain name system queries from a source device to a second-tier domain name system authoritative server designated for a second status, in response to identifying a change of the source device from a first status to the second status, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for reconfiguring a first-tier domain name system authoritative server to redirect domain name system queries from a source device to a second-tier domain name system authoritative server designated for a second status, in response to identifying a change of the source device from a first status to the second status (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for reconfiguring a first-tier domain name system authoritative server to redirect domain name system queries from a source device to a second-tier domain name system authoritative server designated for a second status, in response to identifying a change of the source device from a first status to the second status (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   obtaining, by a processing system including at least one processor, a first plurality of domain name system traffic records of a domain name system platform, the first plurality of domain name system traffic records associated with a source device that is submitting domain name system queries, the source device having a first status, wherein a first-tier domain name system authoritative server of the domain name system platform is configured to forward the domain name system queries from the source device to at least a first second-tier domain name system authoritative server of the domain name system platform designated for the first status;
   detecting, by the processing system, anomalous domain name system traffic records from the first plurality of domain name system traffic records;
   identifying, by the processing system, a change of the source device from the first status to a second status, based upon the detecting the anomalous domain name system traffic records; and
   reconfiguring, by the processing system, the first-tier domain name system authoritative server to redirect the domain name system queries from the source device to at least a second second-tier domain name system authoritative server designated for the second status, in response to identifying the change of the source device from the first status to the second status.

2. The method of claim 1, wherein the first status is one of at least two statuses, and wherein the second status comprises a different one of the at least two statuses.

3. The method of claim 2, wherein the at least the first second-tier domain name system authoritative server and the at least the second second-tier domain name system authoritative server comprise different resource allocations with different processing capabilities.

4. The method of claim 3, wherein the at least the first second-tier domain name system authoritative server and the at least the second second-tier domain name system authoritative server have different:
   numbers of processors;
   quantities of memory;
   rates of responding to domain name system queries; or
   abilities to apply scrubber criteria to domain name system queries.

5. The method of claim 1, wherein the change of the source device from the first status to the second status is identified when more than a threshold number of anomalous domain name system traffic records is detected from the first plurality of domain name system traffic records.

6. The method of claim 1, wherein the source device comprises:
   a domain name system resolver; or
   a client of the domain name system resolver.

7. The method of claim 1, wherein the detecting the anomalous domain name system traffic records comprises:
   generating an input aggregate vector from the first plurality of domain name system traffic records, wherein the input aggregate vector comprises a plurality of features derived from the first plurality of domain name system traffic records;
   applying an encoder-decoder neural network to the input aggregate vector to generate a reconstructed vector, wherein the encoder-decoder neural network is trained with a plurality of aggregate vectors generated from a second plurality of domain name system traffic records;

calculating a distance between the input aggregate vector and the reconstructed vector; and detecting that the first plurality of domain name system traffic records comprises the anomalous domain name system traffic records when the distance is greater than a threshold.

8. The method of claim 7, further comprising:

obtaining the second plurality of domain name system traffic records;

generating the plurality of aggregate vectors from the second plurality of domain name system traffic records, wherein each of the plurality of aggregate vectors comprises a plurality of features derived from the second plurality of domain name system traffic records; and training the encoder-decoder neural network with the plurality of aggregate vectors.

9. The method of claim 8, wherein the first plurality of domain name system traffic records and the second plurality of domain name system traffic records are associated with domain name system queries from at least one domain name system resolver to at least one domain name system authoritative server.

10. The method of claim 9, wherein each of the input aggregate vector and the plurality of aggregate vectors comprises aggregate information associated with domain name system traffic for one of the at least one domain name system resolver over a designated time period.

11. The method of claim 10, wherein the aggregate information comprises, for the one of the at least one domain name system resolver and for the designated time period, at least one of:

a number of queries received;

a number of queries sent;

a number of domain name system authoritative servers contacted;

an average time-to-live value for the queries received;

an average domain name length in the queries received;

a number of unique top level domains included in the queries received; or a number of unique second level domains included in the queries received.

12. The method of claim 10, wherein the aggregate information comprises, for the one of the at least one domain name system resolver and for the designated time period, at least one of:

a number of domain name system resolvers contacting a domain name system authoritative server that is most contacted by the one of the at least one domain name system resolver; or a number of queries received by the domain name system authoritative server that is most contacted by the one of the at least one domain name system resolver.

13. The method of claim 7, wherein the encoder-decoder neural network is to encode the input aggregate vector as a compressed vector representation and to decode the compressed vector representation as the reconstructed vector.

14. The method of claim 13, wherein the detecting the anomalous domain name system traffic records further comprises:

identifying a plurality of clusters from a plurality of compressed vector representations associated with each of a plurality of input aggregate vectors, the plurality of input aggregate vectors including the input aggregate vector.

15. The method of claim 14, wherein the plurality of clusters is identified in a feature space having a plurality of dimensions in accordance with the plurality of compressed vector representations.

16. The method of claim 14, wherein the detecting the anomalous domain name system traffic records further comprises:

obtaining a first label for a first cluster of the plurality of clusters, the first label associated with a first domain name system traffic anomaly type; and detecting that the input aggregate vector is associated with the first cluster.

17. The method of claim 16, wherein the anomalous domain name system traffic records are detected from the first plurality of domain name system traffic records when it is detected that the input aggregate vector is associated with the first cluster.

18. The method of claim 16, wherein the change of the source device from the first status to the second status is identified when more than a threshold number of input aggregate vectors generated from domain name system traffic records associated with the source device are detected to be associated with the first cluster.

19. A non-transitory computer-readable medium storing instructions which, when executed by a processing system including at least one processor, cause the processing system to perform operations, the operations comprising:

obtaining a first plurality of domain name system traffic records of a domain name system platform, the first plurality of domain name system traffic records associated with a source device that is submitting domain name system queries, the source device having a first status, wherein a first-tier domain name system authoritative server of the domain name system platform is configured to forward the domain name system queries from the source device to at least a first second-tier domain name system authoritative server of the domain name system platform designated for the first status;

detecting anomalous domain name system traffic records from the first plurality of domain name system traffic records;

identifying a change of the source device from the first status to a second status, based upon the detecting the anomalous domain name system traffic records; and reconfiguring the first-tier domain name system authoritative server to redirect the domain name system queries from the source device to at least a second second-tier domain name system authoritative server designated for the second status, in response to identifying the change of the source device from the first status to the second status.

20. A device comprising:

a processing system including at least one processor; and a computer-readable medium storing instructions which, when executed by the processing system, cause the processing system to perform operations, the operations comprising:

obtaining a first plurality of domain name system traffic records of a domain name system platform, the first plurality of domain name system traffic records associated with a source device that is submitting domain name system queries, the source device having a first status, wherein a first-tier domain name system authoritative server of the domain name system platform is configured to forward the domain name system queries from the source device to at least a first second-tier domain name system authoritative server of the domain name system platform designated for the first status;

detecting anomalous domain name system traffic records from the first plurality of domain name system traffic records;

identifying a change of the source device from the first status to a second status, based upon the detecting the anomalous domain name system traffic records; and reconfiguring the first-tier domain name system authoritative server to redirect the domain name system queries from the source device to at least a second second-tier domain name system authoritative server designated for the second status, in response to identifying the change of the source device from the first status to the second status.

* * * * *